(12) United States Patent
Detofsky et al.

(10) Patent No.: US 9,059,803 B2
(45) Date of Patent: Jun. 16, 2015

(54) MECHANISM FOR FACILITATING AN OPTICAL INSTRUMENTATION TESTING SYSTEM EMPLOYING MULTIPLE TESTING PATHS

(71) Applicants: Abram M. Detofsky, Tigard, OR (US); Chukwunenye S. Nnebe, Folsom, CA (US); Brett D. Grossman, Forest Grove, OR (US)

(72) Inventors: Abram M. Detofsky, Tigard, OR (US); Chukwunenye S. Nnebe, Folsom, CA (US); Brett D. Grossman, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 13/629,840

(22) Filed: Sep. 28, 2012

(65) Prior Publication Data
US 2014/0092394 A1    Apr. 3, 2014

(51) Int. Cl.
*G01N 21/00* (2006.01)
*H04B 10/40* (2013.01)
*H04B 10/07* (2013.01)

(52) U.S. Cl.
CPC ............... *H04B 10/40* (2013.01); *H04B 10/07* (2013.01)

(58) Field of Classification Search
USPC ............... 356/237.1–237.5, 326; 324/754.03, 324/750.2, 756.01, 756.06, 763.01; 702/72, 702/187
See application file for complete search history.

(56) References Cited

U.S. PATENT DOCUMENTS

| | | | |
|---|---|---|---|
| 6,268,735 B1* | 7/2001 | Craig et al. | 324/603 |
| 8,736,295 B2* | 5/2014 | Watanabe et al. | 324/762.01 |
| 2006/0124842 A1* | 6/2006 | Goto et al. | 250/227.23 |
| 2006/0203228 A1* | 9/2006 | Niki | 356/218 |
| 2009/0085577 A1* | 4/2009 | Butt et al. | 324/537 |
| 2011/0025337 A1* | 2/2011 | Morrow et al. | 324/414 |
| 2012/0098559 A1* | 4/2012 | Bolt et al. | 324/754.03 |
| 2014/0021963 A1* | 1/2014 | Cole | 324/537 |

* cited by examiner

*Primary Examiner* — Hoa Pham
(74) *Attorney, Agent, or Firm* — Blakely, Sokoloff, Taylor & Zafman LLP

(57) ABSTRACT

A mechanism is described for facilitating optical testing of a device under test (DUT) using a testing mechanism having multiple testing paths according to one embodiment. A method of embodiments of the invention may include facilitating, via a loopback path, optical testing of the DUT in a loopback configuration. The loopback configuration may allow for looping between one or more transmitters and one or more receivers of the DUT. The method may further include facilitating, via a spectral path, spectral measurements relating to the DUT.

24 Claims, 5 Drawing Sheets

US 9,059,803 B2

MECHANISM FOR FACILITATING AN OPTICAL INSTRUMENTATION TESTING SYSTEM EMPLOYING MULTIPLE TESTING PATHS

FIELD OF THE INVENTION

The present disclosure generally relates to test platforms, and more particularly, to a mechanism for facilitating an optical instrumentation testing system having multiple testing paths.

BACKGROUND

Electronic or in-circuit testing (ICT) often includes testing a device under test (DUT) for various factors, such as shorts, opens, resistance, capacitance, etc., and purposes, such as filtering, bypassing, power decoupling, etc. However, conventional DUT testing systems are bulky, expensive, and cumbersome to configure and manage. Additionally, such testing systems are known to have fixed configuration which makes it difficult to employ them into certain testing environments, such as a high volume manufacturing (HVM) testing environment. Although certain improvements have been made and various alternative systems (e.g., golden unit testing) have been explored; nevertheless, these system are known to make risky assumptions with regards to the overall DUT design health and remain less than fool-proof solutions.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Figure 1:
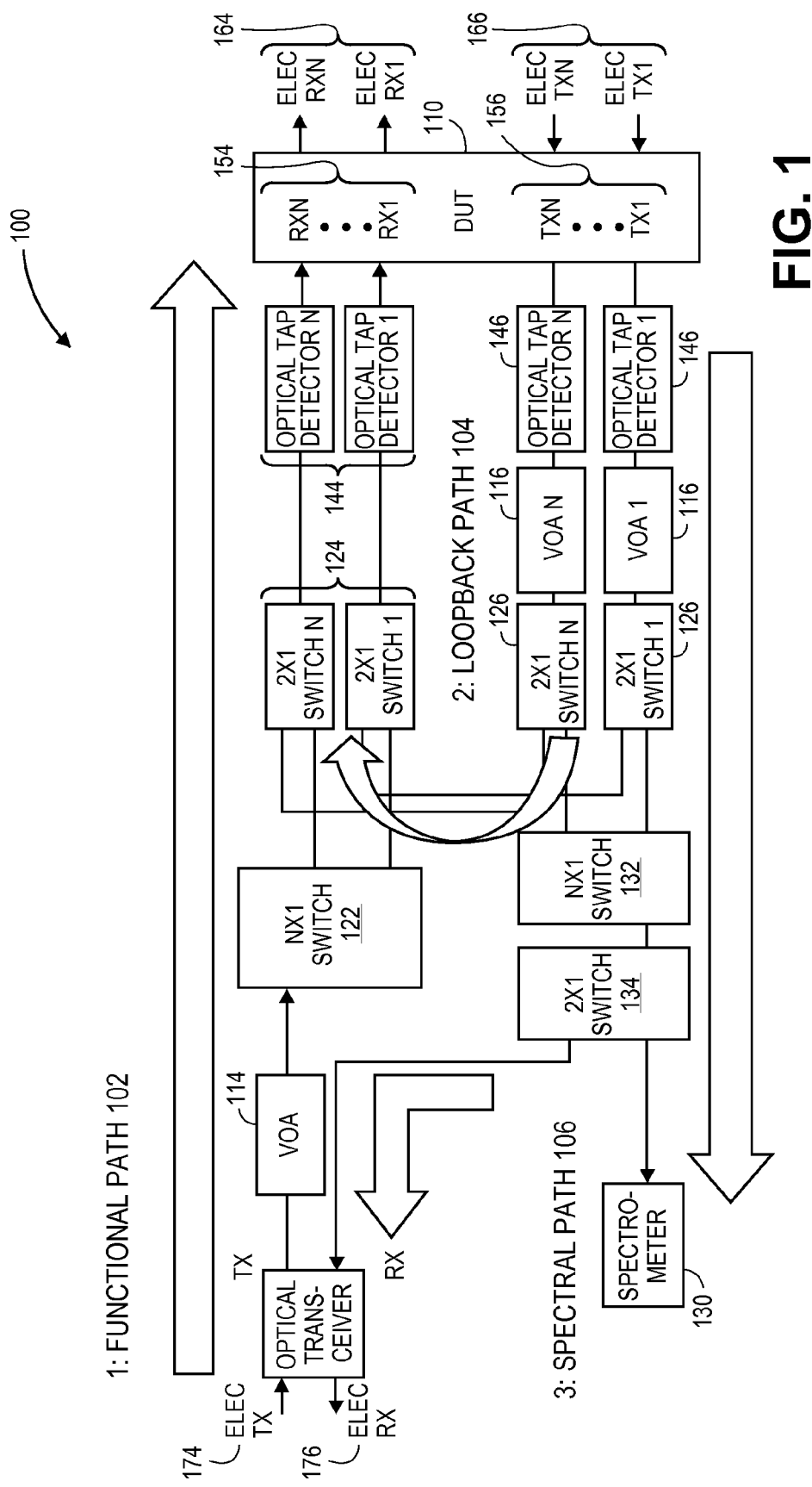
FIG. 1 illustrates an optical instrumentation testing mechanism according to one embodiment.

FIG. 1 illustrates an optical instrumentation testing mechanism 100 according to one embodiment. In one embodiment, optical instrumentation testing mechanism ("testing mechanism") 100 represents a testing system including a number of testing paths (also referred to as "modes"), such as (1) optical functional test path or mode ("functional path") 102 for functional testing at-speed, (2) optical loopback test path or mode ("loopback path") 104 for testing DUT 110 in a self-loopback configuration, and (3) optical spectral analysis path or mode ("spectral path") 106 for testing spectral properties of transmitter ("Tx") ports of DUT 110 and to facilitate further tasks of optical instrumentation testing of DUT 110.

Testing mechanism 100 further includes an optical transceiver ("xceiver") 112 having a high speed electrical on one side and the optical version of that on the other side. Optical transceiver 112 may be integrated onto an integrated circuit ("IC") or chip to turn it into a an optical transceiver chip that can transmit and receive data using optical fiber (also referred to "fiber optic") as opposed to using an electrical wire, such as performing data transfer using light beams or pulses along cables or solid transparent fibers. Optical transceiver 112 may receive a signal through an electrical receiver ("Rx") 174 and transmit a signal through an electrical transmitter 176. Testing mechanism 100 further includes an a series of discrete optical switches for dynamic path configuration, a spectrometer for spectral measurements, an electro-optical transceiver for functional test content generation and checking, discrete variable optical attenuators (VOAs) 114, 116 for optimal margining, and discrete optical tap detectors for in-line power measurements and direct current (DC) calibration of the optical path.

VOAs 1-N 116 may include any number of VOAs corresponding to the number of transmitters 1-N 156 that correspond to the number of electrical transmitters 1-N 166. Similarly, switches 1-N 126 and detectors 1-N 146 may also correspond to transmitters 1-N 156. Further, any number of switches 1-N 124 and detectors 1-N 144 corresponding to the number of receivers 1-N 154 of DUT 110 that further correspond to the number of electrical receivers 1-N 164 may be employed.

Referring back to VOAs 114, 116, an optical attenuator (OA) refers to an electrical optical device used to reduce power levels of an optical signal whether it be in free space or in an optical fiber. OAs include fixed OA, step-wise variable OA, etc., and may further include VOAs 114-118, as illustrated and employed here, that typically use a variable neutral density filter. VOAs 114-118 are advantageous over other OAs for being stable, insensitive to mode and wavelength, and offer a large dynamic range. For example, VOAs 114-118 may obtain an analog voltage from a tester, such as optical transceiver 112 in case of VOA 114, and apply an attenuation level to the optical power, such as by determining a bright signal to a light signal based on that analog voltage. The analog voltage input (e.g., 2 dB equaling 3 volts, 5 volts, etc.) is not limited to a particular amount and that is may be changed or revised, as desired or necessitated.

In one embodiment, functional path 102 replicates or emulates or simulates the way an end-user or customer would use DUT 110 (which is connected optically and electrically to test mechanism 100) while flushing out any problems or errors relating to DUT 110, such as by driving specific traffic patterns exercising specific interfaces while checking other collaterals, like power planes, etc. Functional path 102 not only provides the electrical coverage for DUT 110, but also offers to test is functional behavioral coverage so that DUT 110 is can be both electrically and behaviorally replicated for better and more realistic testing results based on how it is expected to function or functionally behave when used by end-users.

As opposed to solid unit testing, in one embodiment, functional path 102, as illustrated here, employs a number and type of switches 122, 124 to test multiple lanes for more realistic and efficient testing of DUT function behaviors. Further, any number and type of detectors 144 may be employed in functional path 102 to perform various specific measurements to qualify or justify specification functional behaviors of DUT 110 via its receivers 1-N 154 to determine how DUT 110 behaves, such as whether it fails at any point, etc. Detectors 144, 146, for example, can measure the amount of power coming in and going out of DUT 110 which can be used for calibration reasons or other specific measurements, etc. Switches 124 and 126, for example, may be used for routing and re-routing of various signals going in and coming out, respectively, of DUT 110 and, from the scalability point of view, the way switches 124, 126 are arranged may allow for connection and change in connection with any pair of receivers/transmitters 154, 156 such as going from Rx 1/Tx 1 pair to Rx 2/Tx 2 pair to Rx N/Tx N pair, etc., with ease by simply changing the switch matrix, etc. Further, for example, multiplexers may be employed at part of functional path 102 when multiple pairs of receivers 1-N 154 and transmitters 1-N 156 are used.

Further, functional path 102 may work in series or serially with one pair of receivers 1-N 154/transmitters 1-N 156 at a time, while loopback path 104 may work in parallel with any number of receivers 1-N 154/transmitters 1-N 156. For example and in one embodiment, in loopback path 104, any number and type of switches 124, 126 may be strategically placed such that they may generate a loop or loops between any number of receivers 154 and transmitters 156 of DUT 110 and be used to re-perform tasks already performed using functional path 102 and/or spectral path 106. This parallel looping of multiple receivers 154 and transmitters 156 allows for running several tests simultaneously and repeatedly and without having to rely on the tester ability of, for example, optical transceiver 112 each time a test has to be performed. Stated differently, when using loopback path 104, the reliance shifts from being on the tester ability and the continuous use of optical transceiver to the tester and other abilities and capabilities of DUT 110 and its built-in components, such as pattern generators, checkers, etc.

In one embodiment, testing mechanism 100 further employs a spectral path 106 that may include switches 132, 134 and a spectrometer 130. A spectrometer, such as spectrometer 120, refers to a device or instrument to measure properties of light over a specific or specified portion of the electromagnetic spectrum to identify materials, etc. Spectral path 106 may be used to test the spectral properties of DUT 110 which may include examining various colors coming out of DUT 110. For example, spectrometer 130 may receive signals emitted by various transmitters 1-N 156 of DUT 110 and by working those signals, such as one at a time, measure the optical power in each wavelength associated with each signal to properly characterize the signals. It is contemplated that spectrometer 130 and the entire spectral path 130 are not limited to merely single wavelength transmitters and that transmitters 156 may include multi-wavelength transmitters emitting signals with multiple wavelengths and that they are not limited to single-wavelength transmitters that emit single wavelength signals.

It is contemplated that any number and type of components may be added to and/or removed from testing mechanism 100 to facilitate various embodiments of the invention including adding, removing, and/or enhancing certain features. For brevity, clarity, and ease of understanding of testing mechanism 100, many of the standard and/or known components, such as those of a computing device or a testing system or a DUT, are not shown or discussed here. It is contemplated that embodiments of the invention are not limited to any particular technology, topology, system, architecture, and/or standard and are dynamic enough to adopt and adapt to any future changes.

Figure 2:
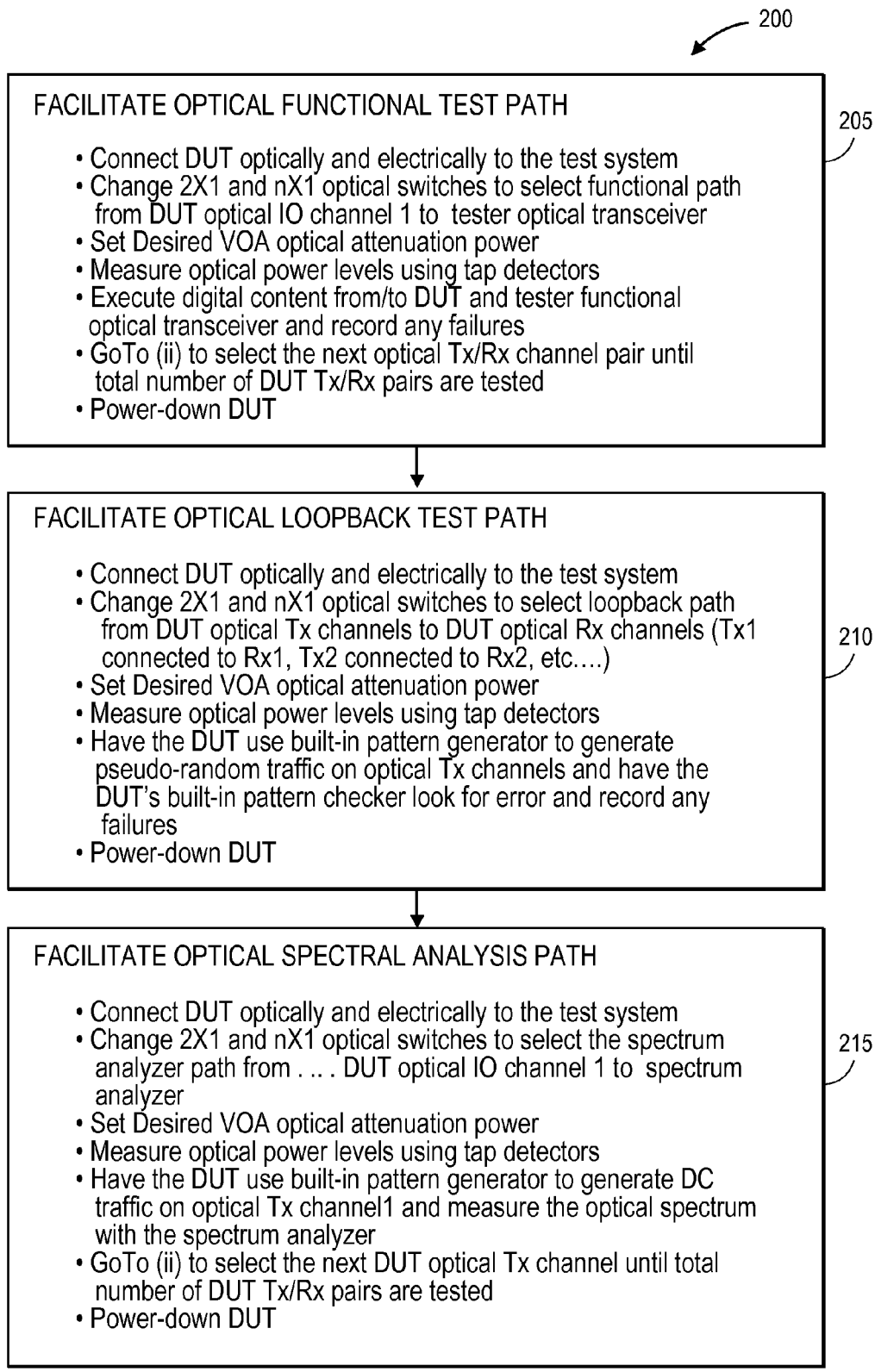
FIG. 2 illustrates a method for testing a DUT using the testing mechanism of FIG. 1 according to one embodiment.

FIG. 2 illustrates a method 200 for testing a DUT using testing mechanism 100 of FIG. 1 according to one embodiment. As described with reference to FIG. 1, testing mechanism 100 includes a functional path, a loopback path, and a spectral path for facilitating DUT testing. Method 200 may be performed by processing logic that may comprise hardware (e.g., circuitry, dedicated logic, programmable logic, etc.), software (such as instructions run on a processing device), or a combination thereof. In one embodiment, method 200 may be performed by testing mechanism 100 of FIG. 1. It is to be noted that for brevity and ease of understanding, various references and details relating to the components described with reference to FIG. 1 are not repeated here.

Method 200 begins at block 205 by facilitating the functional path of the testing mechanism 100 by, first, having a DUT connected, optically and electrically, with a test system employing testing mechanism 100. For example and in one embodiment, various optical switches employed in the functional path, such as switches 2x1 and Nx1, may be set to select the functional path from, for example, DUT optical input/output (I/O) channel 1 of a DUT to a tester optical transceiver, while a desired VOA optical attenuation power may be set for a VOA that is part of the functional path. In one embodiment, optical power levels may then be measured using one or more detectors, while any digital content flowing to and from the DUT and via the tester functional optical transceiver is executed. Subsequently, any detected failures of the DUT (such as with regard to its particular component, such as relating to the optical Tx/Rx channel pair being tested, etc.) are recorded. At this point, optical switches may yet again be changed to select the next optical Tx/Rx channel pair of the DUT until the total number of DUT Tx/Rx pairs are tested. Once the test is accomplished, the functional path is regarded as completed and the DUT may then be powered down.

In one embodiment, method 200 continues with the loopback path at block 210 by connecting, optically and electrically, the DUT to the test system. Further, optical switches, such as switches 2x1 and Nx1, may be changed or set to select the loopback path from the DUT's optical Tx channels to its optical Rx channels (e.g., Tx 1 is connected to Rx 1, Tx 2 connected to Rx 2, Tx N connected to Rx N, etc.), while a desired VOA optical attenuation power may be set for the VOA. Then, optical power levels are measured using one or more detectors and, in one embodiment, the DUT's built-in pattern generators may be used to generate pseudo-random traffic on optical Tx channels and further have the DUT's built-in pattern checker check for errors and record and failures relating to the DUT. Once the test is accomplished, the loopback path is regarded as completed and the DUT may then be powered down.

In one embodiment, method 200 continues with the spectral path by optically and electrically connecting the DUT to the test system at block 215. Further, optical switches, such as switches 2x1 and Nx1, may be changed or set to select the spectral path of the testing mechanism 100 from the DUT's optical I/O channel 1 to spectrum analyzer, while a desired VOA optical attenuation power may be set for the VOA. Then, optical power levels are measured using one or more detectors and, in one embodiment, the DUT's built-in pattern generators may be used to generate DC traffic on optical Tx channel 1 and measure the optical spectrum with the spectrum analyzer. Further, the next DUT optical Tx channel may be selected until a total number of DUT Tx/Rx channels are tested. Once the test is accomplished, the spectral path is regarded as completed and the DUT may then be powered down.

Figure 3:
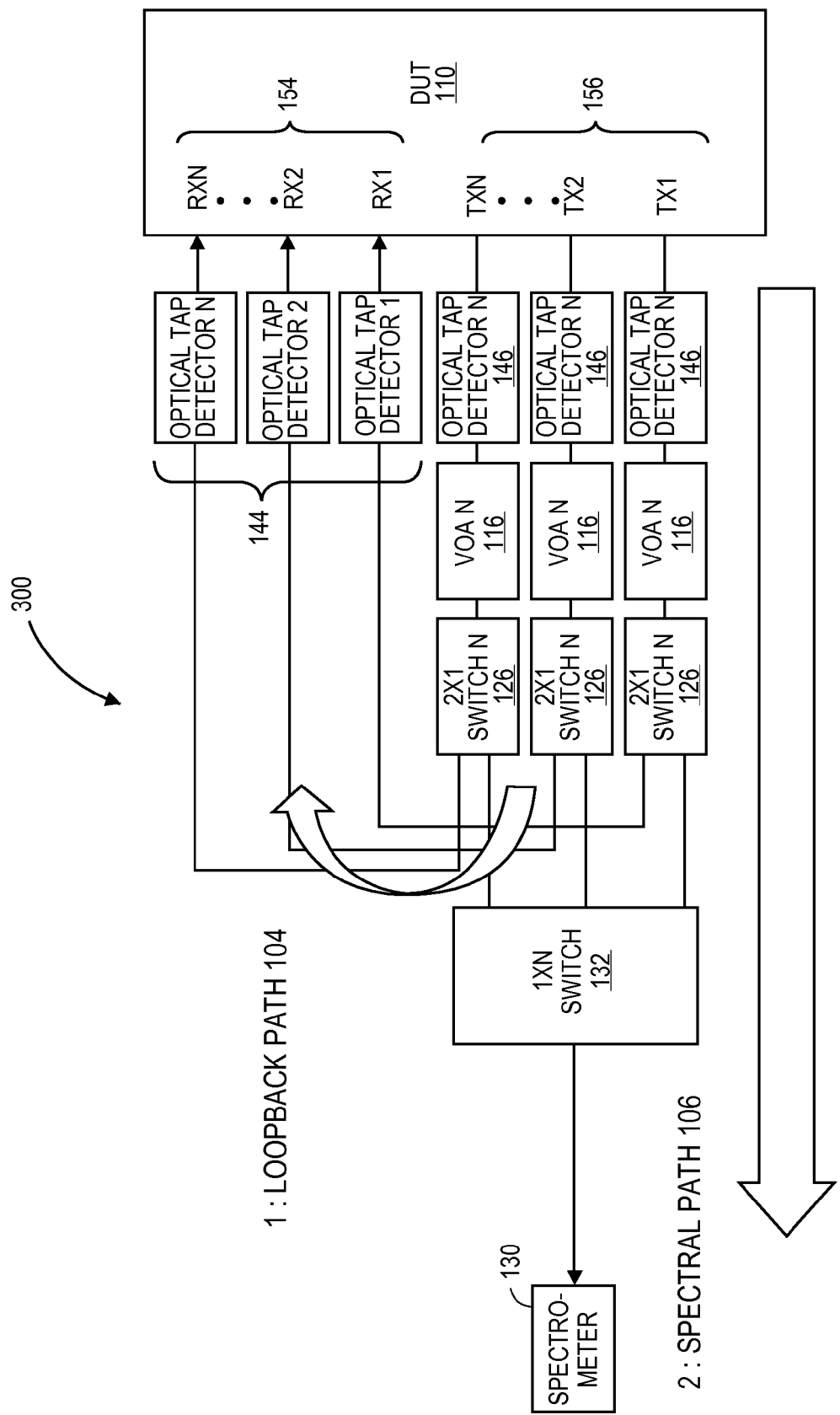
FIG. 3 illustrates an optical instrumentation testing mechanism according to one embodiment.

FIG. 3 illustrates an optical instrumentation testing mechanism 300 according to one embodiment. In this embodiment of testing mechanism 300, functional path 102 of FIG. 1 has been removed and the remaining two paths include loopback path 304 and spectral path 306. It is to be noted that for brevity and ease of understanding, various details of the components described with reference to FIG. 1 are not described here. Having removed functional path 102, testing mechanism 300 provides another design for test (DFT) architecture that may be employed to test DUT 110 in an efficient and cost-effective manner.

In one embodiment, testing mechanism 300 relies on on-die pattern generation and checking in a loopback configuration. As illustrated and in one embodiment, spectral path 306 may be retained having switch 132 and spectrometer 130 and without having the need for spectrometer 134 of FIG. 1 in reconciliation with the removal of the functional path. Testing mechanism 300 provides an additional testing architecture that may be employed, as desired or necessitated, for employing fewer components while achieving additional ease, increased flexibility and longevity. For example, testing mechanism 300 may be used when optical fibers of multiple colors and/or multiple wavelengths are expected as not having the functional path being a part of testing mechanism 300 may eliminate the need for individual matching of, for example, each color and/or wavelength.

It is contemplated that any number and type of components may be added to and/or removed from testing mechanism 300 to facilitate various embodiments of the invention including adding, removing, and/or enhancing certain features. For brevity, clarity, and ease of understanding of testing mechanism 300, many of the standard and/or known components, such as those of a computing device or a testing system or a DUT, are not shown or discussed here. It is contemplated that embodiments of the invention are not limited to any particular technology, topology, system, architecture, and/or standard and are dynamic enough to adopt and adapt to any future changes.

Figure 4:
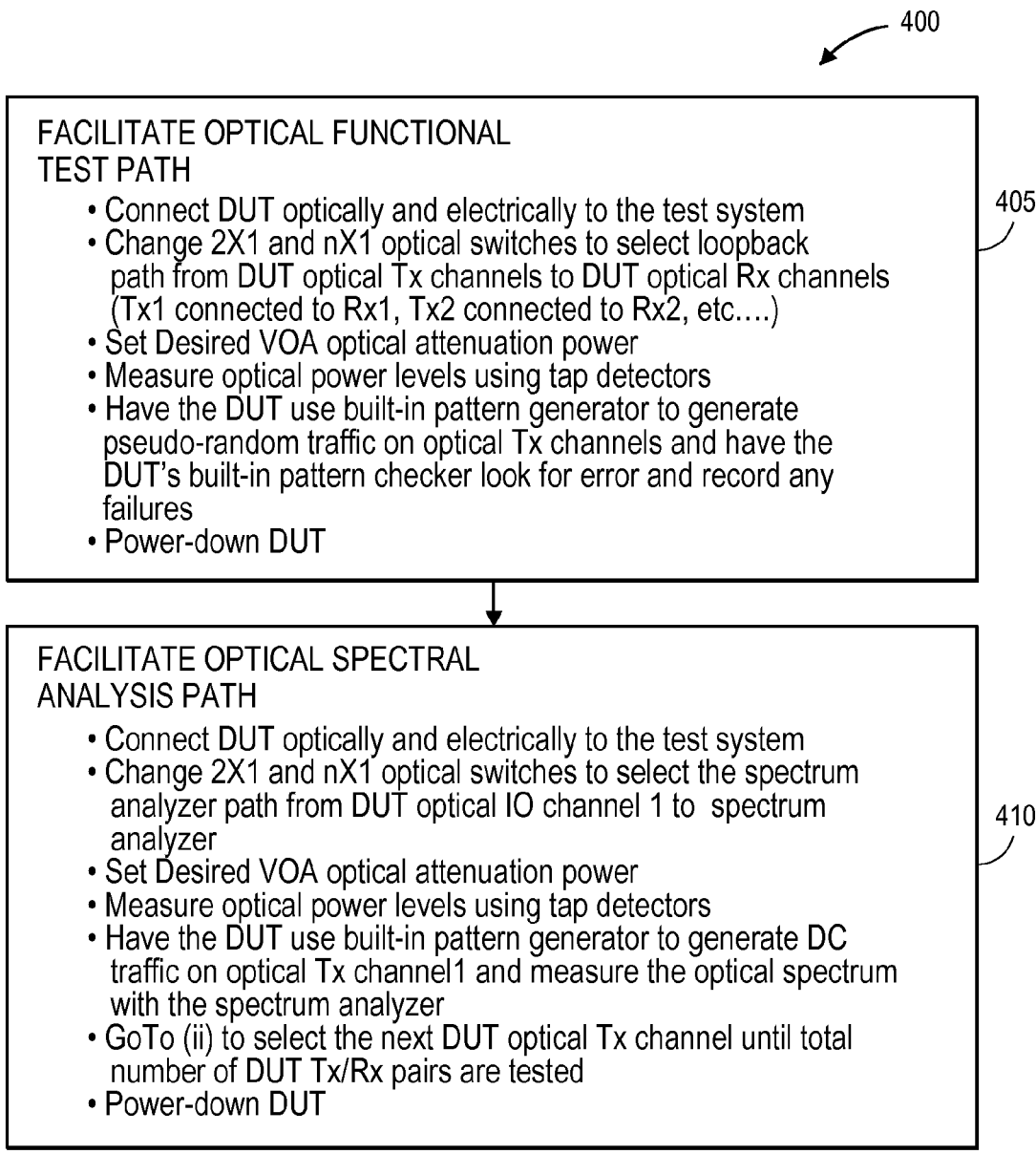
FIG. 4 illustrates a method for testing a DUT using the testing mechanism of FIG. 3 according to one embodiment.

FIG. 4 illustrates a method 400 for testing a DUT using testing mechanism 300 of FIG. 3 according to one embodiment. As described with reference to FIG. 3, testing mechanism 300 includes a loopback path and a spectral path for facilitating DUT testing. Method 400 may be performed by processing logic that may comprise hardware (e.g., circuitry, dedicated logic, programmable logic, etc.), software (such as instructions run on a processing device), or a combination thereof. In one embodiment, method 400 may be performed by testing mechanism 300 of FIG. 3. It is to be noted that for brevity and ease of understanding, various references and details relating to the components described with reference to FIGS. 1-3 are not repeated here.

Method 400 begins at block 405 with the loopback path by connecting, optically and electrically, the DUT to the test system employing the testing mechanism 300. Further, optical switches, such as switches 2x1 and Nx1, may be set to select the loopback path from the DUT's optical Tx channels to its optical Rx channels (e.g., Tx 1 is connected to Rx 1, Tx 2 connected to Rx 2, Tx N connected to Rx N, etc.), while a desired VOA optical attenuation power may be set for the VOA. Then, optical power levels are measured using one or more detectors and, in one embodiment, the DUT's built-in pattern generators may be used to generate pseudo-random traffic on optical Tx channels and further have the DUT's built-in pattern checker check for errors and record and failures relating to the DUT. Once the test is accomplished, the loopback path is regarded as completed and the DUT may then be powered down.

In one embodiment, method 400 continues with the spectral path by optically and electrically connecting the DUT to the test system at block 215. Further, optical switches, such as switches 2x1 and Nx1, may be changed or set to select the spectral path of the testing mechanism 100 from the DUT's optical I/O channel 1 to spectrum analyzer, while a desired VOA optical attenuation power may be set for the VOA. Then, optical power levels are measured using one or more detectors and, in one embodiment, the DUT's built-in pattern generators may be used to generate DC traffic on optical Tx channel 1 and measure the optical spectrum using the spectrum analyzer. Further, the next DUT optical Tx channel may be selected until a total number of DUT Tx/Rx channels are tested. Once the test is accomplished, the spectral path is regarded as completed and the DUT may then be powered down.

Figure 5:
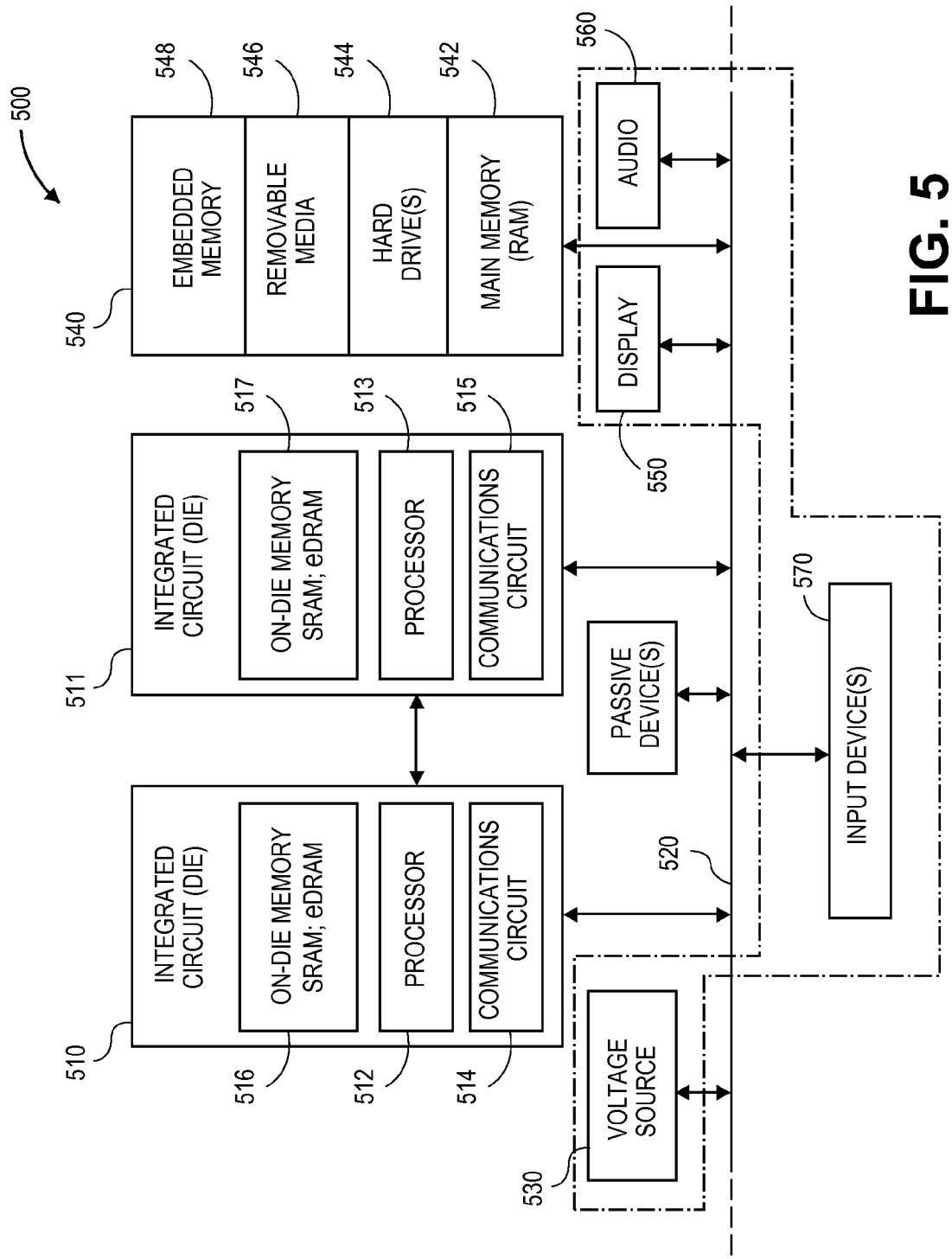
FIG. 5 illustrates one embodiment of a computer system.

FIG. 5 illustrates one embodiment of a computer system 500. The computer system 500 (also referred to as the electronic system 500) as depicted can embody a test system that includes an automated test equipment (ATE) system capable of employing testing mechanism 100 of FIG. 1 and/or testing mechanism 300 of FIG. 3. The computer system 500 may be a mobile device such as a netbook computer. The computer system 500 may be a mobile device such as a wireless smart phone. The computer system 500 may be a desktop computer. The computer system 500 may be a hand-held reader. The computer system 500 may be a server system. The computer system 500 may be a supercomputer or high-performance computing system.

In an embodiment, the electronic system 500 is a computer system that includes a system bus 520 to electrically couple the various components of the electronic system 500. The system bus 520 is a single bus or any combination of busses according to various embodiments. The electronic system 500 includes a voltage source 530 that provides power to the integrated circuit 510. In some embodiments, the voltage source 530 supplies current to the integrated circuit 510 through the system bus 520.

The integrated circuit 510 is electrically coupled to the system bus 520 and includes any circuit, or combination of circuits according to an embodiment. In an embodiment, the integrated circuit 510 includes a processor 512 that can be of any type. As used herein, the processor 512 may mean any type of circuit such as, but not limited to, a microprocessor, a microcontroller, a graphics processor, a digital signal processor, or another processor. In an embodiment, the processor 512 includes a thermal controller having a thermal control interface to receive test data from an automated test equipment (ATE) system and dynamically adjust a target setpoint temperature based on the data and a dynamic thermal controller to receive the target setpoint temperature from the thermal control interface and control a thermal actuator based on the target setpoint temperature as disclosed herein.

In an embodiment, SRAM embodiments are found in memory caches of the processor. Other types of circuits that can be included in the integrated circuit 510 are a custom circuit or an application-specific integrated circuit (ASIC), such as a communications circuit 514 for use in wireless devices such as cellular telephones, smart phones, pagers, portable computers, two-way radios, and similar electronic systems, or a communications circuit for servers. In an embodiment, the integrated circuit 510 includes on-die memory 516 such as static random-access memory (SRAM). In an embodiment, the integrated circuit 510 includes embedded on-die memory 516 such as embedded dynamic random-access memory (eDRAM).

In an embodiment, the integrated circuit 510 is complemented with a subsequent integrated circuit 511. Useful embodiments include a dual processor 513 and a dual communications circuit 515 and dual on-die memory 517 such as SRAM. In an embodiment, the dual integrated circuit 510 includes embedded on-die memory 517 such as eDRAM.

In an embodiment, the electronic system 500 also includes an external memory 540 that in turn may include one or more memory elements suitable to the particular application, such as a main memory 542 in the form of RAM, one or more hard drives 544, and/or one or more drives that handle removable media 546, such as diskettes, compact disks (CDs), digital variable disks (DVDs), flash memory drives, and other removable media known in the art. The external memory 540 may also be embedded memory 548 such as the first die in an embedded TSV die stack, according to an embodiment.

In an embodiment, the electronic system 500 also includes a display device 550, an audio output 560. In an embodiment, the electronic system 500 includes an input device such as a controller 570 that may be a keyboard, mouse, trackball, game controller, microphone, voice-recognition device, or any other input device that inputs information into the electronic system 500. In an embodiment, an input device 570 is a camera. In an embodiment, an input device 570 is a digital sound recorder. In an embodiment, an input device 570 is a camera and a digital sound recorder.

As shown herein, the integrated circuit 510 can be implemented in a number of different embodiments, including a test system that includes a dynamic electro-mechanical interconnect having a cavity for separating, via the cavity, a first conductor of an interconnect from a second conductor of the interconnect, and isolating, via the cavity serving as a buffer, a first electrical path provided through the first conductor from a second electrical path provided through the second conductor. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor die packaged with a thermal interface unit and their equivalents. A foundation substrate may be included, as represented by the dashed line of FIG. 5. Passive devices may also be included, as is also depicted in FIG. 5.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: facilitating, via a loopback path, optical testing of a device under test (DUT) in a loopback configuration, wherein the loopback configuration allows for looping between one or more transmitters and one or more receivers of the DUT; and facilitating, via a spectral path, spectral measurements relating to the DUT.

Embodiments or examples include any of the above methods further comprising facilitating, via a functional path, emulation of one or more functional behaviors of the DUT for testing purposes as encountered by an end-user when using the DUT.

Embodiments or examples include any of the above methods further comprising providing, via the functional path, electrical coverage for the DUT to facilitate electrical replication of the DUT.

Embodiments or examples include any of the above methods wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

Embodiments or examples include any of the above methods wherein the loopback path comprises one or more of the one or more first optical switches and the one or more first detectors corresponding to the one or more receiver channels of the DUT.

Embodiments or examples include any of the above methods wherein the loopback path further comprises one or more second optical switches, one or more second detectors, and one or more VOAs corresponding to one or more transmitter of the DUT.

Embodiments or examples include any of the above methods wherein the spectral path comprises a spectrometer and one or more switches coupled to the functional path or the loopback path.

Embodiments or examples include any of the above methods wherein the DUT comprises one or more of a die on a wafer or a semiconductor package, wherein the semiconductor package includes a casing including one or more semiconductor electronic components.

In another embodiment or example, an apparatus comprises: an optical testing assembly including a loopback path to facilitate optical testing of a device under test (DUT) in a loopback configuration, wherein the loopback configuration allows for looping between one or more transmitters and one or more receivers of the DUT; and a spectral path to facilitate spectral measurements relating to the DUT.

Embodiments or examples include the apparatus above further comprising a functional path to facilitate emulation of one or more functional behaviors of the DUT for testing purposes as encountered by an end-user when using the DUT.

Embodiments or examples include the apparatus above wherein the functional path is further to provide electrical coverage for the DUT to facilitate electrical replication of the DUT.

Embodiments or examples include the apparatus above wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

Embodiments or examples include the apparatus above wherein the loopback path comprises one or more of the one or more first optical switches and the one or more first detectors corresponding to the one or more receiver channels of the DUT.

Embodiments or examples include the apparatus above wherein the loopback path further comprises one or more second optical switches, one or more second detectors, and one or more VOAs corresponding to one or more transmitter of the DUT.

Embodiments or examples include the apparatus above wherein the spectral path comprises a spectrometer and one or more switches coupled to the functional path or the loopback path.

Embodiments or examples include the apparatus above wherein the DUT comprises one or more of a die on a wafer or a semiconductor package, wherein the semiconductor package includes a casing including one or more semiconductor electronic components.

In another embodiment or example, a system comprises: a test system comprising an automated test equipment (ATE) system including an optical testing mechanism to perform optical testing of a device under test (DUT), wherein the optical testing mechanism includes: a loopback path to facilitate optical testing of a device under test (DUT) in a loopback configuration, wherein the loopback configuration allows for looping between one or more transmitters and one or more receivers of the DUT; and a spectral path to facilitate spectral measurements relating to the DUT.

Embodiments or examples include the system above further comprising a functional path to facilitate emulation of one or more functional behaviors of the DUT for testing purposes as encountered by an end-user when using the DUT.

Embodiments or examples include the system above wherein the functional path is further to provide electrical coverage for the DUT to facilitate electrical replication of the DUT.

Embodiments or examples include the system above wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

Embodiments or examples include the system above wherein the loopback path comprises one or more of the one or more first optical switches and the one or more first detectors corresponding to the one or more receiver channels of the DUT.

Embodiments or examples include the system above wherein the loopback path further comprises one or more second optical switches, one or more second detectors, and one or more VOAs corresponding to one or more transmitter of the DUT.

Embodiments or examples include the system above wherein the spectral path comprises a spectrometer and one or more switches coupled to the functional path or the loopback path.

Embodiments or examples include the system above wherein the DUT comprises one or more of a die on a wafer or a semiconductor package, wherein the semiconductor package includes a casing including one or more semiconductor electronic components.

In another embodiment or example, an apparatus comprises means for performing any one or more of the operations mentioned above.

In yet another embodiment or example, at least one machine-readable medium comprising a plurality of instructions that in response to being executed on a computing device, causes the computing device to carry out a method according to any one or more of the operations mentioned above.

In yet another embodiment or example, at least one non-transitory or tangible machine-readable comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
an optical testing assembly including
a loopback path to facilitate optical testing of a device under test (DUT) in a loopback configuration, wherein the loopback configuration allows for looping between one or more transmitters and one or more receivers of the DUT, wherein the loopback path is further to facilitate
re-performing of tasks already performed using at least one of a functional path and a spectral path, and
parallel looping of the one or more transmitters and the one or more receivers to allow for simultaneous and repeated running of multiple tests without having to rely on a tester; and
the spectral path to facilitate spectral measurements relating to the DUT.

2. The apparatus of claim 1, further comprising the functional path to facilitate emulation of one or more functional behaviors of the DUT for testing purposes as encountered by an end-user when using the DUT.

3. The apparatus of claim 2, wherein the functional path is further to provide electrical coverage for the DUT to facilitate electrical replication of the DUT.

4. The apparatus of claim 2, wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

5. The apparatus of claim 4, wherein the loopback path comprises one or more of the one or more first optical switches and the one or more first detectors corresponding to the one or more receiver channels of the DUT.

6. The apparatus of claim 5, wherein the loopback path further comprises one or more second optical switches, one or more second detectors, and one or more VOAs corresponding to one or more transmitter of the DUT.

7. The apparatus of claim 1, wherein the spectral path comprises a spectrometer and one or more switches coupled to the functional path or the loopback path.

8. The apparatus of claim 1, wherein the DUT comprises one or more of a die on a wafer or a semiconductor package, wherein the semiconductor package includes a casing including one or more semiconductor electronic components.

9. A test system comprising:
an automated test equipment (ATE) system including an optical testing mechanism to perform optical testing of a device under test (DUT), wherein the optical testing mechanism includes:
a loopback path to facilitate optical testing of a device under test (DUT) in a loopback configuration, wherein the loopback configuration allows for looping between one or more transmitters and one or more receivers of the DUT, wherein the loopback path is further to facilitate
re-performing of tasks already performed using at least one of a functional path and a spectral path, and
parallel looping of the one or more transmitters and the one or more receivers to allow for simultaneous and repeated running of multiple tests without having to rely on a tester; and
the spectral path to facilitate spectral measurements relating to the DUT.

10. The test system of claim 9, further comprising the functional path to facilitate emulation of one or more functional behaviors of the DUT for testing purposes as encountered by an end-user when using the DUT.

11. The test system of claim 10, wherein the functional path is further to provide electrical coverage for the DUT to facilitate electrical replication of the DUT.

12. The test system of claim 10, wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

13. The test system of claim 12, wherein the loopback path comprises one or more of the one or more first optical switches and the one or more first detectors corresponding to the one or more receiver channels of the DUT.

14. The test system of claim 13, wherein the loopback path further comprises one or more second optical switches, one or more second detectors, and one or more VOAs corresponding to one or more transmitter of the DUT.

15. The test system of claim 9, wherein the spectral path comprises a spectrometer and one or more switches coupled to the functional path or the loopback path.

16. The test system of claim 9, wherein the DUT comprises one or more of a die on a wafer or a semiconductor package, wherein the semiconductor package includes a casing including one or more semiconductor electronic components.

17. A method comprising:
facilitating, via a loopback path, optical testing of a device under test (DUT) in a loopback configuration, wherein the loopback configuration allows for looping between one or more transmitters and one or more receivers of the DUT, wherein facilitating, via the loopback path, further includes
re-performing of tasks already performed using at least one of a functional path and a spectral path, and
parallel looping of the one or more transmitters and the one or more receivers to allow for simultaneous and repeated running of multiple tests without having to rely on a tester; and
facilitating, via the spectral path, spectral measurements relating to the DUT.

18. The method of claim 17, further comprising facilitating, via the functional path, emulation of one or more functional behaviors of the DUT for testing purposes as encountered by an end-user when using the DUT.

19. The method of claim 18, further comprising providing, via the functional path, electrical coverage for the DUT to facilitate electrical replication of the DUT.

20. The method of claim 18, wherein the functional path employs one or more components including one or more of an optical transceiver, a variable optical attenuators (VOAs), a first plurality of optical switches including one or more first optical switches corresponding to one or more receiver channels of the DUT, and one or more first detectors corresponding to the one or more receiver channels of the DUT.

21. The method of claim 20, wherein the loopback path comprises one or more of the one or more first optical switches and the one or more first detectors corresponding to the one or more receiver channels of the DUT.

22. The method of claim 21, wherein the loopback path further comprises one or more second optical switches, one or more second detectors, and one or more VOAs corresponding to one or more transmitter of the DUT.

23. The method of claim 17, wherein the spectral path comprises a spectrometer and one or more switches coupled to the functional path or the loopback path.

24. The method of claim 17, wherein the DUT comprises one or more of a die on a wafer or a semiconductor package, wherein the semiconductor package includes a casing including one or more semiconductor electronic components.

* * * * *